US007216173B2

(12) United States Patent
Clayton et al.

(10) Patent No.: US 7,216,173 B2
(45) Date of Patent: May 8, 2007

(54) VIRTUAL PRIVATE NETWORK SOFTWARE SYSTEM

(75) Inventors: Tom Clayton, Encinitas, CA (US); Richard Bruce Rakes, Atlanta, GA (US)

(73) Assignee: Varian Medical Systems Technologies, Inc., Palo Alto, CA (US)

( * ) Notice: Subject to any disclaimer, the term of this patent is extended or adjusted under 35 U.S.C. 154(b) by 561 days.

(21) Appl. No.: 10/154,445

(22) Filed: May 21, 2002

(65) Prior Publication Data

US 2002/0199007 A1    Dec. 26, 2002

Related U.S. Application Data

(60) Provisional application No. 60/297,577, filed on Jun. 12, 2001.

(51) Int. Cl.
*G06F 15/16* (2006.01)
(52) U.S. Cl. .............. 709/227; 709/203; 713/161; 713/168; 713/169; 713/170
(58) Field of Classification Search ............... 709/227; 713/168–170, 201, 400, 161, 166
See application file for complete search history.

(56) References Cited

U.S. PATENT DOCUMENTS

| 6,003,084 | A |   | 12/1999 | Green et al. ............... 709/227 |
| 6,041,355 | A |   | 3/2000 | Toga ........................... 709/227 |
| 6,058,250 | A |   | 5/2000 | Harwood et al. ............ 709/227 |
| 6,079,020 | A | * | 6/2000 | Liu ............................. 713/201 |
| 6,081,900 | A |   | 6/2000 | Subramaniam et al. ...... 713/201 |
| 6,101,549 | A |   | 8/2000 | Baugher et al. ............. 709/238 |
| 6,112,228 | A |   | 8/2000 | Earl et al. .................... 709/205 |
| 6,138,009 | A | * | 10/2000 | Birgerson .................... 455/419 |
| 6,144,996 | A |   | 11/2000 | Starnes et al. ............... 709/217 |
| 6,148,337 | A |   | 11/2000 | Estberg et al. .............. 709/224 |
| 6,574,742 | B1 | * | 6/2003 | Jamroga et al. ............. 713/400 |
| 6,680,922 | B1 | * | 1/2004 | Jorgensen .................... 370/328 |

(Continued)

OTHER PUBLICATIONS http://www.zmed.com/ids/index.html—1 webpage entitled "image delivery solutions", dated Sep. 4, 2001. At this point, without waiving the right to present futher evidence on this matter, for examination purposes assume that this webpage was available by Oct. 1, 2000.

(Continued)

*Primary Examiner*—Yves Dalencourt
(74) *Attorney, Agent, or Firm*—Foley & Lardner LLP

(57) ABSTRACT

A virtual private network service provider, wherein virtual private network ("VPN") software for setting up a virtual private network connection is delivered from a server computer to one or more client computers over a computer network, such as the Internet. Once the VPN software is delivered to the client computers, it can be executed so that data communications are made as virtual private network communications under control of the VPN software. Because the VPN software is stored and maintained on a server computer, and preferably delivered to the various client computers on an as-needed basis, the distribution, integrity and updating of the VPN software is improved because the "master" version of the VPN software can be controlled and revised by merely accessing the server computer system, rather than by attempting to control and revise numerous copies of the VPN software resident on various, scattered client computers.

14 Claims, 7 Drawing Sheets

U.S. PATENT DOCUMENTS

2002/0023210 A1* 2/2002 Tuomenoksa et al. ...... 713/161
2002/0099826 A1* 7/2002 Summers et al. .......... 709/227

OTHER PUBLICATIONS http://www.zmed.com/ids/highlights.html—2 webpages entitled "image delivery solutions—HIGHLIGHTS", dated Sep. 4, 2001 (second page is blank). At this point, without waiving the right to present further evidence on this matter, for examination purposes assume that this webpage was available by Oct. 1, 2000.

http://www.zmed.com/ids/epiphany.html—1 webpage, entitled "image delivery solutions—ePIPHANY iSOLUTIONS tm", dated Sep. 4, 2001. At this point, without waiving the right to present further evidence on this matter, for examination purposes assume that this webpage was available by Oct. 1, 2000.

http://www.zmed.com/ids/webpak.html—1 webpage entitled "image delivery solutions—ePIPHANY iSOLUTIONS tm", dated Sep. 4, 2001. At this point, without waiving the right to present further evidence on this matter, for examination purposes assume that this webpage was available by Oct. 1, 2000.

http://www.zmed.com/ids/nvision.html—1 webpage entitled "image delivery solutions—ePIPHANY iSOLUTIONS tm", dated Sep. 4, 2001. At this point, without waiving the right to present further evidence on this matter, for examination purposes assume that this webpage was available by Oct. 1, 2000.

http://web.archive.org/web/2002048032500/www.openssh.org/features.html. 3 webpages entitled OpenSSH Features printed on Dec. 1, 2006, but from http://web.archive.org appearing to have a corresponding date of Jan. 20, 2002.

http://web.archive.org/web/20020202141244/www.socks.nec.com/sockesfaq.html. 6 webpages entitles Socks Faqs printed on Dec. 1, 2006, but from http://web.archive.org appearing to have a corresponding date of Feb. 2, 2002.

http://www.networkworld.com/news/2002/0121ssl.html. 5 webpages entitled Networkworld Vendors tout easier VPNs. Printed on Dec. 1, 2006, but article in the webpages shows a a date of Jan. 21, 2002.

Cable/DSL Routers Linksys, User Guide (date 2002) 66 pages.

* cited by examiner

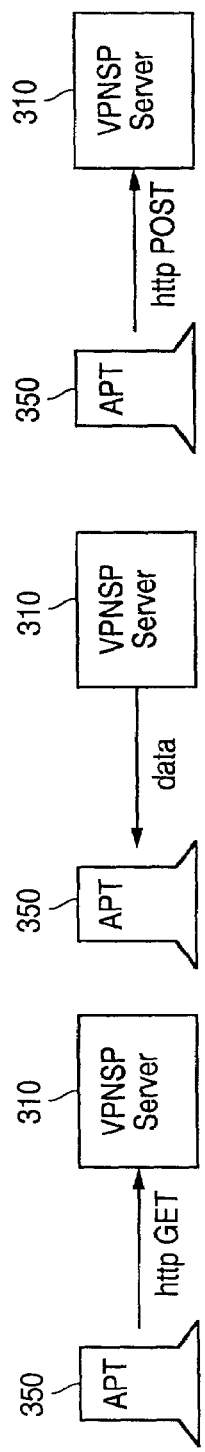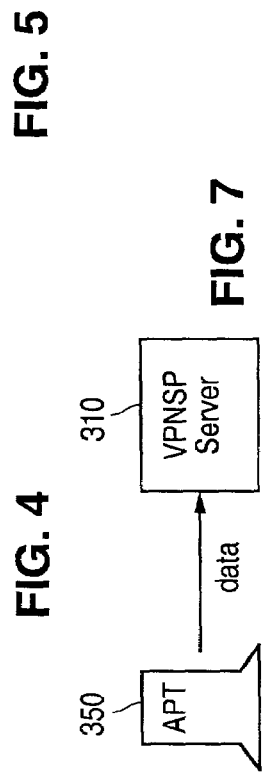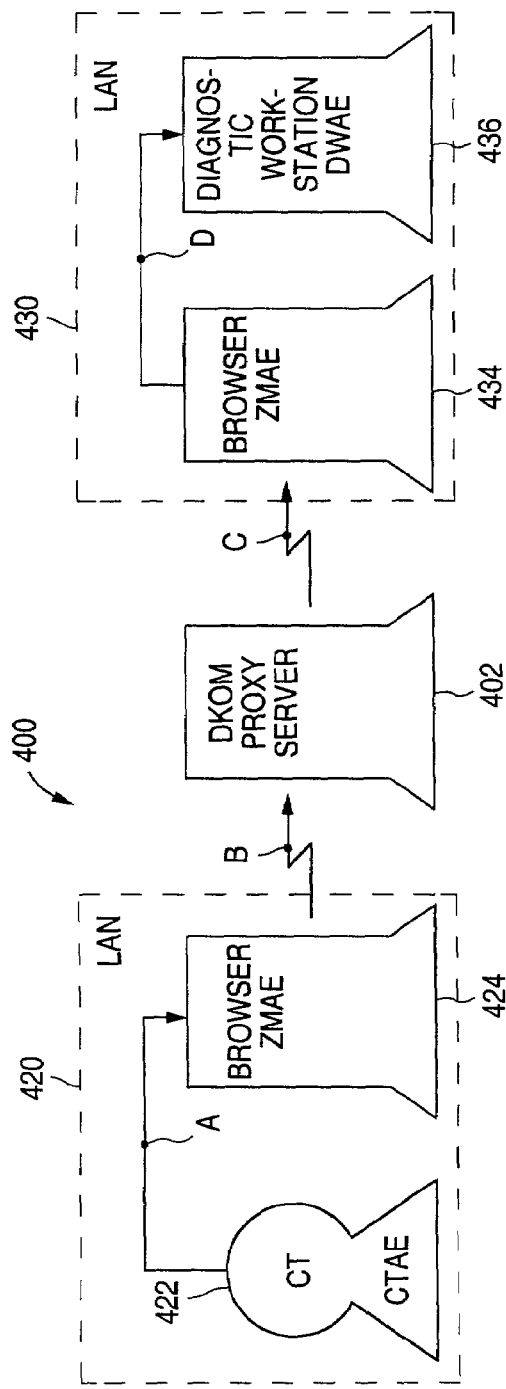

VIRTUAL PRIVATE NETWORK SOFTWARE SYSTEM

REFERENCE TO RELATED APPLICATIONS

This application claims the benefit of U.S. Provisional Patent Application No. 60/297,577, filed Jun. 12, 2001.

FIELD OF THE INVENTION

The present invention is directed to data communications effected over computer networks (e.g., wired networks, wireless networks, virtual networks), and more particularly to virtual private network software for effecting virtual private network type communications over a public computer network.

BACKGROUND OF THE INVENTION

FIG. 1 is a block diagram of conventional computer network system 100, which shows two different, conventional ways of communicating computer data over a computer network. Computer network system 100 includes wide area network ("WAN") 102, client A computer 110, client B computer B 120 and server computer 130.

WAN 102 is a conventional wide area network, such as the Internet. WAN 102 is a public network in that access to the network is generally open to the public. WAN 102 preferably includes wireless and wired portions which are preferably integrated at least as seamlessly as technology will allow.

Client A computer 110 is a conventional computer, such as a desktop personal computer that includes standard browser software 114 (e.g., Netscape, Microsoft Internet Explorer). (Note, the names Netscape and Microsoft Internet Explorer may be subject to trademark or service mark rights.) Similarly, Client B computer 120 is a conventional computer, such as a desktop personal computer that includes standard browser software 124 (e.g., Netscape, Microsoft Internet Explorer).

This browser software (including, as necessary, dialer software, modem software, scripting language interpretation software and the like) allows the computers to set up connections NLC (see FIG. 1) over the WAN. Typically, these connections do not allow the computers to receive unsolicited communications, but rather, the computers can receive only communications that they solicit. (See double arrows marked NLC terminating at reference numerals 114 and 124 and definition of "unsolicited-input connection" below in the Specially Defined Terms section of this document.) Through the connection NLC, the computer's browser can specifically request and then receive computer data from other computers that are in data communication with WAN 102. By establishing connection NLC, which does not accept unsolicited data, the computer can communicate over WAN 102 without concern that it will be bombarded with unsecure, unwanted or even harmful computer data (e.g., a virus) because connection NLC will categorically refuse to receive any computer data communications beyond those it has previously requested.

While this type of solicited-input-only connection is favorable from a safety standpoint, the connection is somewhat limited because it cannot accept unsolicited data. For example, browser software 114 of client A computer 110 cannot communicate directly with browser 124 of client B computer system. Each of these browsers communicates data exclusively over solicited-input-only connections NLC. Accordingly, neither browser can listen for or receive such requests, so no computer data ever gets exchanged. If all connections to WAN 102 were solicited-input-only connections, then there would be no data communication whatsoever, over this computer network.

However, some computers have the software necessary to establish unsolicited-input connections LC. For example, server computer 130 is a conventional server computer with a conventional listening connection to WAN 102. Server computer 130 listens for and receives requests for computer data from the browsers of various client computers (e.g., client A computer 110, client B computer 120), and sends back appropriate computer data, via WAN 102, in response to the various requests. For example the requested computer data may be a hypertext mark-up language ("HTML") code for generating a web page.

Also, server computer 130 can be used to allow the operator of client A computer 110 to communicate with the operator of client B computer 120. For example, if client A computer 110 may communicate with server computer 130 to establish an email account on server 130. In this case, client B computer 120 can use the solicited-input-only connection of its browser software to upload computer data (as email messages and/or attachments), through the unsolicited-input connection of server computer 130, to a storage device (not separately shown) in the server computer. After the computer data is stored and present at the server computer, client A computer can request and receive this computer data through the solicited-input-only connection of its browser software 114. In this way, client A computer and client B computer can communicate their data through the solicited-data-only connections of their respective browsers.

Now, while the server computer has a unsolicited-data-only connection, it is noted that the server computer will not indiscriminately respond to all incoming, unsolicited communications. Rather, the server may implement sophisticated techniques for attempting to sort out the desirable requests to upload and download computer data to the server computer. Firewall software is one example of such a sophisticated technique. It should be borne in mind that WAN 102 is a public network, so a great many parties may accidentally or purposely send communications to server computer 130.

While many of these communications will be well-intended and appropriate communications (e.g., email correspondence), some of the communications will be malformed, misdirected, and/or malicious. For example, a malicious communication may be intended and designed to get server computer 130 to download all of its data to a snoop, hacker or other unauthorized party. Server computer 130 is preferably equipped with software to identify such malicious communications and to prevent any unauthorized transmissions or computer actions.

However, because server 130 is connected to a public network, and because it is very difficult to identify and stop all malicious communications, the security of the standard client-server architecture explained above is limited in the security and data integrity. In recognition of this fact, certainly highly sensitive communications (e.g., communications containing credit card information, communications containing medical information) are not typically communicated using the standard type of browser-driven network communication explained above. One alternative method of network communication, which is more secure, will now be explained with further reference to FIG. 1.

As shown in FIG. 1, client A computer 110 has additionally been equipped with conventional virtual private network ("VPN") software 112. Similarly, client B computer has been equipped with VPN software 122. This is conventionally accomplished by putting the VPN software on a CD ROM, or other removable storage device, physically bringing the CD ROM to each client computer and copying the VPN software to a permanent storage device (e.g., hard disk drive) present at each computer.

Once the VPN is installed at client A computer 110 and client B computer 120, then these two computers can communicate in a more secure manner. More particularly, most VPN software is structured to accept only authorized communications. For example, many conventional VPN software systems encrypt and decrypt data using algorithms and encryptions keys present in or generated by the VPN software. Additionally, the VPN software may allow a client computer to establish a sort of unsolicited-input connection such that client computers can communicate more directly with each other over a public network. (When the client computers can communicate directly, it may be something of a misnomer to call them "client" computers.)

The VPN software affects a "virtual" private network because the general public will still have access to the telephone lines and other communication links of the WAN. However, the VPN software can structure the data of its communication so that they are harder to access and/or interpret, and so that it is more difficult to send unauthorized data through the VPN software connection. In other words, the VPN software at both ends of the communication makes it difficult for the general public (with WAN access) to cause any mischief with respect to the data communications sent over the WAN under control of the VPN software.

A third type of conventional computer network communication will now be explained with reference to FIG. 2. More particularly, FIG. 2 is a block diagram of network computer system 200 for making network communications by proxy. Computer system 200 includes WAN 202, local area network ("LAN") 204, LAN server computer 210 and client C computer. Again, WAN is a public network for making network communications over long distances. WAN 202 is preferably the Internet. WAN server computer 230 is a conventional server computer and is similar to server computer 130 discussed above.

LAN server computer 210, LAN 204 and client C computer 220 make up a local area network. The local area network allows LAN server computer 210 and client C computer to mutually communicate computer data. For example, LAN networks are a common architecture for organizing the various computers in a business office. If the LAN is a private network, as LAN's often are, then there is a relatively high degree of security because only personnel with access to the computers in the business office can access the network for unauthorized or destructive reasons.

From a security standpoint, it might not be desirable to connect any portion of the LAN to WAN 202. By connecting the various computers of the LAN to WAN 202, this opens up the potential for unauthorized communications to come in from the world at large. As such, the security level would decrease down toward the level associated with WAN's. However, it is often impractical to categorically prevent the computers of the LAN from receiving computer data from the outside world.

In order to allow computers of a LAN to receive computer data from the outside world (e.g., the Internet) using their browser software, while still providing a sufficiently high level of security, the communication technology of proxy communication has been developed. In the example of FIG. 2, proxy software has been installed on LAN server computer 210 in order to allow proxied computer data communications between client C computer 220 and computers connected to the WAN, such as WAN server computer 230.

Proxied communication technology is conventional and will not be discussed in great detail herein. Generally speaking, proxy software is used to cache information received over a WAN and acts as an intermediary between the WAN and client computers that are in communication with the proxy software (but not otherwise in direct data communication with the WAN). The proxy software holds common and/or recently-used data from the WAN (e.g., WAN server computer 230) for client computers in order to provide quicker access and to increase server security.

Perhaps more importantly, proxy servers can be constructed to allow client computers to send and receive data communications, when there is a firewall interposed between the client computer and the WAN. For example, this kind of proxy software may open a socket on the proxy computer (e.g., LAN server computer 210) and allow data communication with the WAN via the open socket. In this case, the proxy software would allow requests from the browser software of a client computer (e.g., browser software 222 of client C computer 220) to go out over the WAN to their intended destination. Often proxy software involves revising the network address specified within an incoming or outgoing data communication so that the client computer and its browser software may act as if it were directly connected to the WAN and its multitude of various WAN servers (e.g., WAN server computer 230).

To summarize, three conventional ways of making network communications have been described: (1) traditional client-server architecture; (2) VPN communications and (3) proxied communications. As discussed below, the present invention identifies and makes improvements to VPN and/or proxied communication processes and associated software.

One conventional device that is used in making computer network communications is called a router, which is a hardware device that connects and forwards data between two separate networks. Many routers also handle errors and keep statistics about the data communications made over the network. Conventional routers can be implemented as hardware, firmware and/or software. Although conventional router software can be transmitted over a network, the installation of such software typically requires some level of user intervention. For example, a download of conventional router software usually requires either an explicit download instruction or a request to use the software.

Another conventional device that is used in making computer network communications is called a firewall. Firewalls are devices that are used to block and/or filter data. These devices are commonly used with routers as part of a single component.

SUMMARY OF THE INVENTION

The present invention recognizes and contemplates some shortcomings or potential problems in the prior art. These shortcomings and potential problems will now be discussed.

First, VPN software and/or proxy software is conventionally initially loaded onto "client" computers or LAN server computers by physically bringing a copy of the software to each and every computer where the software is to be loaded and then loading the software. If the copies of the VPN and/or proxy software is stored on a CD ROM or other removable storage device, then these storage devices must be physically shipped to the computers where the software is to be installed. Alternatively, the software maybe preloaded at the time the pertinent computers are manufactured. Both removable media software distribution and software distribution by pre-loading are subject to pervasive logistical issues, costs and difficulties.

Second, VPN software and/or proxy software is subject to change over time as ancillary computer and communications technology develops. For example, VPN software made to run well with a first operating system software may not perform as well (or at all) when the first operating system is discarded in deference to a new and improved operating system. In this situation, a revised VPN software, for use with the new and improved operating system, would need to be transported to the affected machines, or the affected machines would need to be shipped to where the revised VPN software was. This burdensome task of revising or replacing VPN and/or proxy software may need to be repeated quite often, especially if the VPN and/or proxy software is to stay current with the ancillary technology, or if there are bugs in the VPN and/or proxy software.

Third, the conventional way of distributing VPN and/or proxy software can involve something of a security risk. For example, if CD ROM's containing a particular VPN software are widely distributed by mail, then there is a potential that some party will seize one of the CD ROM's and copy the VPN software in an unauthorized manner. While it is true that security mechanisms may be encoded onto the CD ROM to prevent unauthorized copying, but even with these copy prevention mechanisms there are still potential problems: (1) copy prevention features can sometimes be defeated by determined, unauthorized copyists; (2) the copy prevention features complicate the process of encoding and/or using the CD ROM; and (3) the encoded copy prevention features take up "real estate" on the limited CD ROM recording surface.

Fourth, the conventional way of distributing VPN and/or proxy software can be limiting insofar as how the software is to be paid for. More particularly, if VPN software manufacturer sends a CD ROM copy of the VPN software to a business customer, then the manufacturer will not readily know how often the VPN software is being used. This makes it difficult to structure payment for the VPN software on a per use basis. While a per use payment structure may or may not be desired by the contracting parties in every instance, it is nice to leave this payment structure open as an option for the times that software sellers and buyers want to effect compensation for the software in that way.

Fifth, according to the conventional way of distributing VPN and/or proxy software, the software must be stored permanently at each computer (e.g., LAN server computer) where the software is to be used. For example, valuable hard disk storage space may need to be permanently allocated to VPN and/or proxy software at every machine.

Generally speaking, the present invention involves distribution of VPN and/or proxy software from a server computer to various, scattered client computers through a computer network, such as the Internet. In this way, the VPN and/or proxy software must merely be maintained to be current, for on-demand use by authorized parties, at the server computer. The VPN and/or proxy software need not be physically redistributed every time a revision is made in the software code. Also, at least some embodiments of VPN software according to the present invention mandate that the VPN network communications pass through a central server computer as they travel from a source VPN computer system to a destination VPN computer system.

At least some embodiments of the present invention may exhibit one or more of the following objects, advantages and benefits:

(1) easier and less expensive to initially install VPN and/or proxy software on a plurality of client computers;

(2) easier and less expensive to install revised versions of VPN and/or proxy software on a plurality of client computers on an ongoing basis;

(3) more frequent VPN and/or proxy software updates are feasible because of the ease of distributing revised versions of software according to the present invention;

(4) better supervision and control of the use of VPN and/or proxy software, because the software may be distributed on-demand on an as-needed basis;

(5) better accounting of the amount of actual use of VPN and/or proxy software, because the software may be distributed on-demand on an as-needed basis;

(6) use of a central server in connection with VPN computer network transmissions allows better tracking of VPN communications; and (7) use of a central server in connection with VPN computer network transmissions allows each VPN client to establish an unsolicited-input connection with the central server computer.

According to one aspect of the present invention, a computer network communication system includes a client computer system, a first computer network, and a server computer system. The server computer system includes a storage device and VPN server software. The storage device stores VPN software. The VPN server software communicates the VPN software to the client computer system over the first network. The VPN software being executable by the client computer system to: (1) restructure first-network-unready machine readable data at the client computer system into corresponding first-network-ready machine readable data; and (2) send the first-network-ready data from the client computer system to a destination computer system over the first computer network.

According to a further aspect of the present invention, a computer network communication system includes a client computer system, a first computer network, and a server computer system. The server computer system includes a storage device, VPN software stored on the storage device, and VPN server software. The VPN server software communicates the VPN software to a client computer system over the first network. The VPN software is executable by the client computer system. The VPN software includes machine readable instructions and data for causing the client computer to set up an unsolicited-input connection with the first network. The client computer receives first-network-ready machine readable data from the first network over the unsolicited-input connection, regardless of whether the first-network ready data has been requested by the client computer system.

According to a further aspect of the present invention, a computer network communication system includes a private computer network, a proxy client computer, a source computer, a public computer network and a server computer system. The source computer is in data communicative connection with the proxy client computer over the private computer network. The source computer is structured to send a first data communication over the private computer network. The first data communication includes destination data indicative of the intended destination of the first data communication. The destination is a location that is not present on the private network. The server computer system is in data communicative connection with the proxy client computer over the public computer network. The server computer system includes a storage device and proxy server software. Proxy software is stored on the storage device. The proxy server software communicates the proxy software to the proxy client computer system over the public network. The proxy software is executable by the proxy client computer system. The proxy software includes machine readable instructions and data for causing the source computer to recognize the proxy client computer as the destination indicated by the destination data and for thereby causing the source computer to send the first data communication to the proxy client computer over the private computer network. According to a further aspect of the present invention, a method of communicating machine readable data over a computer network includes several steps. One step is storing and maintaining VPN software on a VPN server computer system, with the server computer system being in data communication with a public computer network. Another step is downloading a copy of the VPN software from the VPN server computer system to a first client computer system over the public computer network. Another step is downloading a copy of the VPN software from the VPN server computer system to a second client computer system over the public computer network. Another step is restructuring, at the first client computer system under the control of the downloaded VPN software. More particularly, a first data communication of machine readable data, structured according to a first protocol, is restructured into a corresponding second data communication of machine readable data structured according to a second protocol. The first protocol is unsuitable for communication over the public network. The second protocol is suitable for communication over the public computer network. Another step is sending the second data communication from the first client computer system to the second client computer system over the computer network. Another step is restructuring, at the second client computer system under the control of the downloaded VPN software, the second data communication into a corresponding third data communication of machine readable data structured according to a third protocol. The third protocol is unsuitable for communication over the public network.

Further applicability of the present invention will become apparent from a review of the detailed description and accompanying drawings. It should be understood that the description and examples, while indicating preferred embodiments of the present invention, are not intended to limit the scope of the invention, and various changes and modifications within the spirit and scope of the invention will become apparent to those skilled in the art.

BRIEF DESCRIPTION OF THE DRAWINGS

The present invention will become more fully understood from the detailed description given below, together with the accompanying drawings, which are given by way of illustration only, and are not to be construed as limiting the scope of the present invention. In the drawings:

FIGS. 4 to 7 are block diagrams illustrating a method of computer network data communication according to the present invention.

FIG. 8 is a block diagram of a second embodiment of a computer network communication system according to the present invention.

DETAILED DESCRIPTION OF THE PREFERRED EMBODIMENTS

Figure 1:
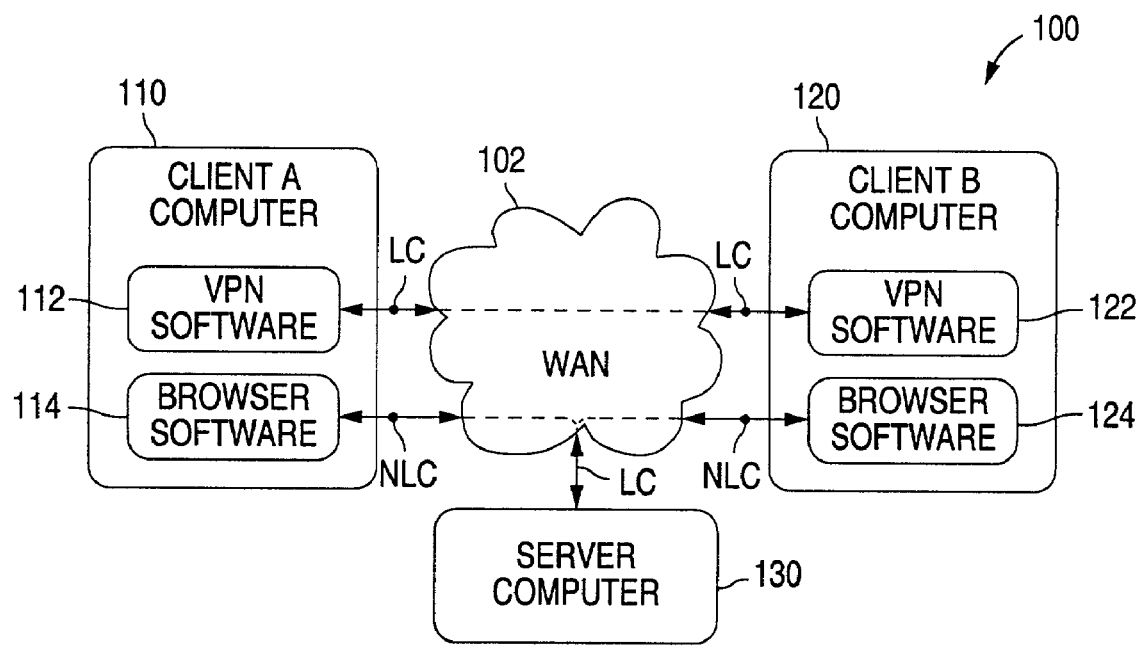
FIG. 1 is block diagram showing a first conventional computer network communication system.
Figure 2:
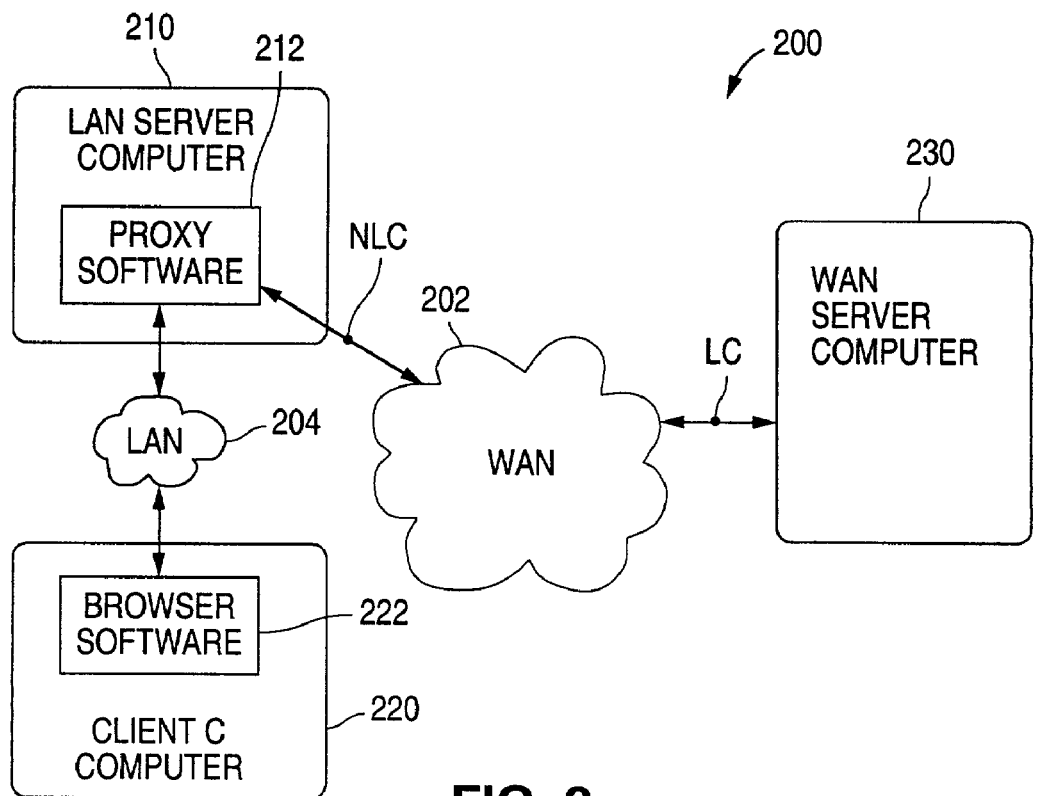
FIG. 2 is block diagram showing a second conventional computer network communication system.

Before starting a description of the Figures, instructions for interpreting the words and phrases of this patent document will be provided. More particularly, many jurisdictions allow a patentee to act as its own lexicographer, and thereby allows the patentee to provide instructions in a patent document as to how the words, terms and phrases of the document are to be interpreted as a legal matter. For example, in the United States, the prerogative of the patentee to act as its own lexicographer has been solidly established based on statutory and case law. Accordingly, the following section provides rules for interpreting the words, terms and phrases of this particular patent document.

Interpretive Rules

Rule 1: There is a "Specially Defined Terms" section set forth below. Only words, terms or phrases that are explicitly defined in the Specially Defined Terms are to be considered to have a special definition, and, of course, the explicit definition provided herein is to serve as the definition for these terms. Accordingly, sources such as the patent specification and extrinsic evidence shall not be used to help define these terms—the explicitly provided definitions shall control.

In some cases, the explicit definition will be partial or supplemental in nature. As a hypothetical example, a definition that read "horses include, but are not limited to, ponies" would amount to only a supplemental definition for the term "horses." In the case of a supplemental definition, any interpretational issues that are not answered by the supplemental definition shall be decided by the rules for non-specially-defined terms set forth below (that is, Rules 2 to 4).

Rule 2: If a word, term or phrase is not specially defined, then its definition shall be determined in the first instance by resort to "pre-existing" definitions that can be found in dictionaries and/or technical lexicons that exist as of the time this patent document is filed. (See definition of "dictionaries and technical lexicons" below in the Specially Defined Terms section.) It is acknowledged that dictionaries and technical lexicons often provide alternative definitions. Also, pre-existing definitions provided in different dictionaries and different lexicons often differ and are not always entirely consistent. In these kinds of circumstances, it must be decided which pre-existing definition is in best accordance with this document when read as a whole. Rules 3 and 4, set forth below, provide some guidelines for choosing between alternatives, pre-existing definitions for a word, term or phrase.

Rule 3: The role of the specification (other than the Specially Defined Terms section) as an interpretive or definitional aid shall be limited to helping choose between alternative, pre-existing definitions that meet the requirements of Rule 2 (above).

Rule 4: The role of extrinsic evidence (e.g., expert witnesses) as an interpretive of definitional aid shall be limited to helping choose between alternative, pre-existing definitions that meet the requirements of Rule 2 (above).

Specially Defines Terms the present invention: means at least some embodiments of the present invention; references to various feature(s) of the "present invention" throughout this document do not mean that all claimed embodiments or methods include the referenced feature(s).

structured to: this phrase is used in the claims to indicate that some thing X is "structured to" perform some objective Y. This means that X must have appropriate structure to meet the objective Y that occurs after the "structured to" language. It does not mean that the possible structures for X are limited to what is shown in the specification, but rather includes any and all X, now conventional or to be developed in the future, wherein the structure of X allows the X to perform objective Y. (Note that X and Y are used as variables in this definition of "structured to;" in the claims, various things may be recited as the X variable for purposes of applying this definition, and various objectives may be recited as the Y variable.)

comprising . . . a; comprising . . . one; comprising . . . x: comprising means including; for example, if a claim recites that an assembly "comprising a" widget, then the claim should be construed to cover assemblies that have one widget or more than one widget, the fact that the assembly includes a widget does not mean that covered assemblies are limited to one widget unless such a limitation is explicitly present in the claim.

dictionaries and/or technical lexicons: any document whose primary purpose is the definition of words, terms and/or phrases; on the other hand, documents that merely discuss, explain or provide examples of devices or methods, without purporting to provide definitions of specific words, phrases or terms, are not to be considered as dictionaries and/or technical lexicons.

computer network: includes, but is not limited to, wired networks, wireless networks and virtual networks.

client computer system: any computer system that can receive data communications over a computer network.

server computer system: any computer system that can send data communications over a computer network, including, but not limited to, computer systems that are capable of receiving and responding to unsolicited requests for computer data over a computer network; it is noted that a computer system may simultaneously be both a client computer system and a server computer system according to the definitions set forth herein.

VPN: Virtual Private Network; this phrase and associated acronym broadly signify any software that is useful in helping to maintain some level of enhanced privacy for computer network communications and is not limited to specific VPN software or algorithms now conventional.

VPNSP: service provider for providing any sort of VPN.

DICOM: Digital Imaging and Communications in Medicine.

SMTP: Simple Mail Transfer Protocol.

SSL: Secure Socket Layer.

first protocol/second protocol: this is not limited to situations where the first and second protocols are alternative protocols at the same level; for example the second protocol may be a higher level protocol than the first protocol; in this example of protocols at different levels, the data would be considered to be restructured from a first protocol to a second protocol, even if the addition of the higher level (that is, second) protocol was merely additional data wrapped around or overlaid upon the first protocol data, thereby leaving the first protocol intact in a sense.

first type automatic: download occurs without an explicit download instruction from the user.

second type automatic: when the user has no reason to be aware that a download is taking place.

third type automatic: download occurs without any input from the user beyond a request to use the software (e.g., opening up a VPNSP icon on a desktop display).

HTTP: Hyper Text Transfer Protocol.

POP: Post Office Protocol.

IMAP: Internet Message Access Protocol.

TCP/IP: Transmission Control Protocol/Internet Protocol.

communication software: software used to exchange information between computers.

router software: communication software used to route information between computers.

applet: any computer program that cannot run in stand-alone fashion over an operating system; applets include, but are not limited to, applets written in the Java computer language.

unsolicited-input connection: Any connection between a computer and a computer network where the computer runs a listener (e.g., a conventional server computer), or at least includes the functionality of a listener at least to the extent that the computer can accept unsolicited input from the network. An example of such functionality is set forth below in connection with FIGS. 4 to 10, where a connection is established by issuing GET commands on an open thread. On the other hand, conventional Internet-connected client computers do not typically have unsolicited-data connections, but rather have solicited-data-only connections. Also, unsolicited-input connection may require special software commands and/or hardware to allow unsolicited input. For example, the GET commands of FIGS. 4 to 7 are used to establish the unsolicited-input connection of that example. However, these GET commands, and other similar commands are not considered to be solicitations because they do not directly solicit any specific communications, but rather merely keep the door open for unsolicited communications from one or more remote sources.

Introduction

It is proposed to design and build a unique means of providing secure data transfer over public lines, such as the Internet. In recent times, Virtual Private Networks (VPN's) have served this purpose. A potential problem with VPN's is that they are costly and difficult to implement; i.e., they require a proprietary hardware and/or software solution to be installed at both the sending and receiving ends of the network.

A practical example in the medical community is communication between two remote radiology networks. Medical images are transmitted using a standard called DICOM ("Digital Imaging and Communications in Medicine"). The DICOM standard does not have any intrinsic provisions for security and was intended to be used over internal Local Area Networks (LAN's) and not Wide Area Networks (WAN's). In order for patient images from a CT or MRI scanner at an outlying clinic to be transmitted to a central hospital using DICOM, either an expensive dedicated private line would have to be installed, or a VPN setup over a public network to link the two local area networks. Both of these potential solutions require the use of specialized hardware and software (routers, firewalls, etc.).

At least some embodiments of the present invention involve provision of a central server (for example: vpnsp.zmed.com) which would serve up a Java based applet within a Web browser. (It is noted that the words "Java" and "zmed" may be subject to trademark rights.) This applet proxies network traffic on the sending end and forward data to a similar receiving applet at the remote destination. Security is maintained through the browser's built-in SSL encryption. The benefit of this model is that no specialized hardware, nor software, need be installed at either end of the transmission. The only requirement is that web browsers on both the sending and receiving LAN's have secure Web access via the Internet (or other public network) to the remote server. The remote server supplies the applets. Thus, a secure connection can be made between any two cooperating sites without any consideration of existing firewalls, Internet routes, Network Address Translation (NAT), etc.

This general idea is extensible for any type of network traffic and could be referred to as a Virtual Private Network Service Provider ("VPNSP"). A central server on a public network would serve up applets (e.g., Java applets) on demand to readily (freely) available applet players. For example, applet players will often reside on existing hosts inside the respective firewalls. These applet players may be nothing more than Java-enabled Web browsers such as Netscape or Internet Explorer. With this setup, users will be able to create their own VPN's on the fly and will always have immediate access to the latest applet version.

At least some of the embodiments of the present invention involve a single server that serves a single applet within a single Web browser. In this situation, the client can be a source of data, a destination for data, or both a source and a destination for data. Other architectures for implementing the present invention include, but are not limited to: (1) multiple servers that serve a single applet/browser combination; (2) multiple servers that serve multiple applet/browser combinations; and (3) a single server that serves multiple applet/browser combinations.

A specific exemplary implementation of the VPNSP concept is a DICOM proxy web client for the medical imaging community. The DICOM proxy web client enables remote facilities to share patient images in the DICOM protocol using nothing more than Web accessible/Java-enabled Web browsers. Both the transmitter and the receiver detect their respective locally accessible proxy applet as a DICOM device. The DICOM traffic is effectively tunneled through the respective Web browsers. The VPNSP software, working in conjunction with the Web browser, mimics (or enables) a conventional DICOM communication device.

All of the above is completely feasible using existing browser technology and the right applet and server. However, this unique use of Web browsers is very different from the original intended use (which is to deliver content sent from remote servers). This ease of deployment of the VPN software (via remote server applets using the Service Provider model) is one of the inventive features of at least some embodiments of the present invention. As far as is known to the inventors, all other techniques of "punching" through firewalls from the inside out currently require the implementation of hardware and operating system (OS) specific software—usually at the OS level. This invention is completely hardware and software independent and allows for a single universal applet to be distributed to mutually-remote client computers by the central server.

General Implementation (VPNSP)
  Centralized Internet accessible web server providing:
  Administration/Account management
  Signed applets
  Higher level protocol proxies
  Caching facilities
  Data flow:
    User points browser to URL of external web server and logs in.
    Signed applet is automatically downloaded into the applet player and commences running silently.
    Signed applet in the browser runs a listening connection on the LAN. The applet is digitally signed in order to have access to local computers resources such as a network port. Without this confirmation, typical applets run in a 'sandbox' mode preventing them from accessing the host computer's network ports, local hard drive, etc. For example, the listening connection may be implemented by running a listener on a single TCP/IP port on the LAN.
    Forwards all connections (traffic on listened port) to central Internet server via the existing HTTP connection.
    Central server authenticates connection and routes traffic based on an incoming source and destination handle. This handle can be supplied by the central server upon initial account registration and setup. Data can then be cached on the server if the receiving host (applet) is not connected yet.
    Data is sent to remote signed applet over its open HTTP connection.
    Data is forwarded to receiving host over a local TCP/IP port.

First Embodiment

A first embodiment of a computer network communication system according to the present invention. More particularly, computer network communication system 300 will now be described with reference to FIGS. 3 to 10. System 300 includes: Internet 302, virtual private network service provider ("VPNSP") server 310, institution A 320 and institution B 330.

Figure 3:
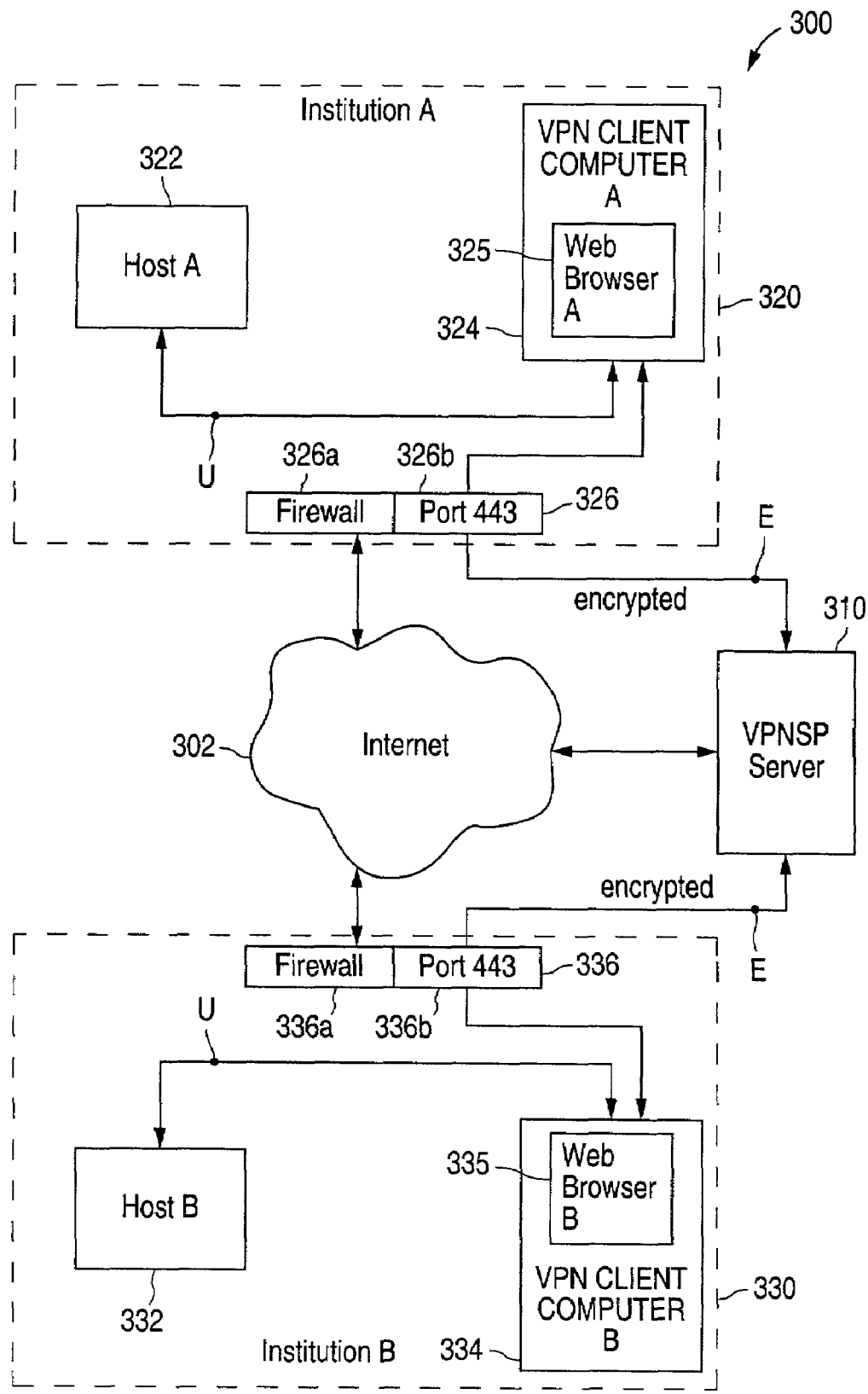
FIG. 3 is a block diagram of a first embodiment of a computer network communication system according to the present invention.

In FIG. 3, host A 322 desires to communicate, in a secure fashion, with host B 332. Host B 332 is at a location remote from host B 332. Both hosts are sitting on their own respective LAN's (institution A 320 and institution B 330) and are behind firewalls 326, 336 connected to the Internet. For illustration purposes, assume both firewalls 326, 336 have been configured to block all traffic except for initiated outgoing HTTPS (port 443). Thus, this example demonstrates how this technique can work in the most restrictive firewall settings.

Both LAN's 320, 330 also have PCs 324, 334 running a standard web browser 325, 335 with SSL (HTTPS) encryption. Both browsers also have access to the Internet via port 443 326b, 336b, in order to browse secure Internet web sites. A user at institution A 320 logs into the VPNSP server 310 via an HTTPS (port 443) connection. By doing this, the user has announced his intention to communicate with Host B 332 and will be authenticated by the VPNSP server 310 as having the permission to communicate with Host B 332. At this point, a Java applet will be downloaded into web browser A 325 that will be prepared to forward incoming traffic from web browser A 325 to Host B 332. A user at institution B 330 will similarly download a Java applet into web browser B 335 and will be listening on some predefined port on institution A's LAN 320.

Since host A 322 can connect via the predefined port directly to web browser A's IP address, host A 322 can commence to transmit data to web browser A's applet. The applet however is connected to the central VPNSP server 310 via the HTTPS connection and will thus commence to forward data to the VPNSP server. Assuming that Web browser B 335 has also made an HTTPS connection to the same VPNSP 310, the data will be immediately forwarded to the applet running on web browser B 335 at institution B 330, over its already open HTTPS connection. The Java applet running on web browser B 335 will then forward the data over institution B's LAN 330 directly to host B 332. As far as host B 332 is concerned, web browser B 335 is considered to be host A 322, and the reverse is true for host A 322 and web browser A 325 (i.e., host A thinks that web browser A is host B).

Note that both web browser A 325 and web browser B 335 preferably have live HTTPS connections to VPNSP server 310 simultaneously for this to work. An alternative is a "delayed transfer" or "store and forward" approach where web browser A 325 is connected to VPNSP server 310 and web browser B 335 is not. Host A 322 could still transmit data via web browser A 325 from where it will be temporarily cached at VPNSP server 310. As far as host A 322 is concerned, the data has been successfully transmitted. As soon as web browser B 335 connects to VPNSP server 310, the cached data will now be transmitted on to host B 332 and removed from the VPNSP server. This delayed transfer model can be implemented by an additional upper layer protocol implementation on the VPNSP server. Another (less preferred alternative) is to write the VPNSP code so that communications pass directly between the browsers without going through intermediate server 310.

In the above example, either host A 322 or host B 332 could be a user on his home PC directly connected via their respective Internet service provider ("ISP") to the Internet. Also, the applet player may actually reside on the sending or receiving host.

Now, communication methodology will be discussed. The standard HTTP model used by web browsers only allows client to server requests under a solicited-data-only type connection. In standard HTTP systems, a web server typically cannot initiate communication to a web browser. The system 300 embodiment of the present invention has bi-directional communication between the browsers and the server. In order to achieve this, a bi-directional model is implemented where the client does initiate all requests.

A preferred method for initially establishing an unsolicited data connection will now be discussed with reference to FIGS. 4 to 7. FIGS. 4 and 5 illustrate how the remote server initiates sending data to a client. At FIG. 4, an applet 350 initiates connection with an HTTP GET request to remote VPNSP server 310. If no data destined for the client is immediately available, the server may keep the connection open by not replying to the GET immediately. If a timeout occurs or the connection closes for any unknown reason, the client immediately issues another GET request to the server. Note that the idle state of this model is an open GET request to which no response has yet been made.

FIG. 5 shows how the server sends data to applet 350. Note that the server can send data to the client at any time (in response to an open GET request). FIGS. 6 and 7 illustrate how a client initiates sending data to the remote server. At FIG. 6, applet 350 issues a standard HTTP POST request. At FIG. 7, applet 350 sends data as part of the normal POST transmission. This transaction terminates normally after the data is sent. Note that the client can send data to server at any time (by issuing a new HTTP POST request). Although in reality the client initiates all communications, this model effectively simulates full bidirectional socket functionality, and thereby provides a type of unsolicited-input connection because the client listens for data from VPNSP server 310.

Second Embodiment

Now, upper layer protocol and proxy services will be discussed with reference to FIG. 8. In addition to the secure tunneling described thus far, upper layer proxy services can be included in the VPNSP server to provide complete turnkey solutions for secure Internet transmission of a specific network protocol. The following section will describe one example of an implementation of this concept. In particular, a DICOM proxy service will be described which enables secure transmission of medical images. As pointed out before, this proxy service is supplied via machine independent applets from a centralized server.

This approach completely solves the deployment problem of installing software on both ends (standard approach). Since the applets on each end can communicate upstream to the central server through the firewall, they thus have the ability to proxy local traffic over these same existing open, unsolicited-input connections.

A computer network communication system 400 according to the present invention, involving DICOM Proxy Service, will now be explained with reference to FIG. 8. Host A is present in the form of a medical image device CT scanner 422 and Host B is present in the form of remote viewing station 436 at a remote diagnostic center. Despite the lack of an expensive private communication line connecting these remote locations, system 400 allows private and sensitive medical images to be sent between remote locations (across town or even across the world).

In system 400, CT scanner 422, at a first hospital, communicates directly with a diagnostic workstation ("WS") 436, located at a different hospital, using the DICOM protocol and the DICOM proxy applets. For illustration purposes we will assume that the DICOM traffic on both LAN's 420, 430 is affected using the DICOM standard TCP/IP port 104. Alternatively, any port could be used.

In FIG. 8, CT scanner 422 has its own application title of CTAE. For it to transmit (push) patient images to the Diagnostic Workstation using DICOM protocol, it must have an Application Entity (AE) Title, TCP port number, and IP address for the remote workstation. Since there is no direct connection to the remote workstation, the CT is instead given a "fake" application title "ZMAE," the IP address of the browser, and in this case, port 104. The first step is that the user uses browser 424 to connect and login to DICOM Proxy Server 402. Another user at the remote location will do the same with his browser 434. At the remote site of LAN 430, diagnostic workstation 436 has been configured to receive images from the "fake" application title "ZMAE" on its end along with the IP address of browser 434 and the port (again 104 in this example).

When all the connections are in place, CT scanner 422 makes a DICOM association with ZMAE. The applet running on browser 424 simply forwards the DICOM association via HTTPS as in the generic VPNSP case to DICOM proxy server 402. Here DICOM proxy server 402 accepts the association and effectively fools CT scanner 422 into thinking it is talking to a real DICOM destination (DWAE). DICOM proxy server 402 does the real work of taking the incoming DICOM packets and stripping the "fake" destination (in this case ZMAE) and replacing it with the real destination AET (DWAE). DICOM Proxy Server 420 preferably knows the true destination, as this was setup when the account was initially created.

In summary, two methodologies are implemented to allow the above example to work. The first methodology is the tunneling of the DICOM traffic through existing web HTTP connections created by the browsers and forwarded locally by the signed applets running within the two respective browsers. This is different from the conventional approach because the proxy software itself is deployed by a machine and OS independent applet. The second methodology is the actual high level proxying of the DICOM protocol itself by the DICOM Proxy Server. This implementation of the DICOM protocol allows each local host to think it is connecting to another local host when in fact the actual data is being tunneled through the public Internet and securely encrypted. In combination, these two techniques work especially well in combination for connecting an internet protocol between two remote locations over a secured public line in a hardware and OS independent fashion and without the permanent installation of any additional hardware or software at either the transmitting or receiving end.

Third Embodiment

Figure 9:
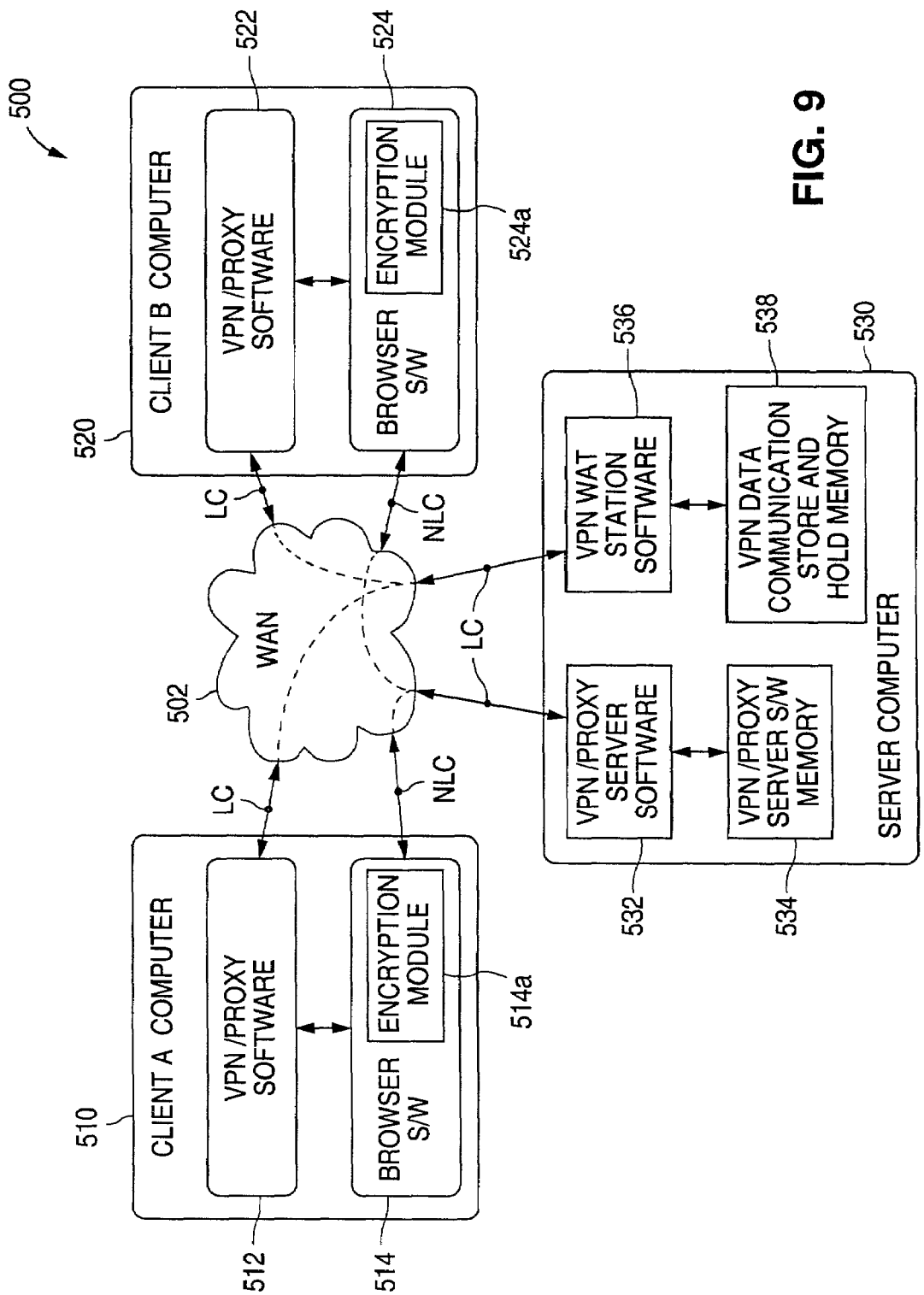
FIG. 9 is a block diagram of a third embodiment of a computer network communication system according to the present invention.

FIG. 9 shows a third embodiment of a computer network communication system 500 according to the present invention. System 500 includes WAN 502, client A computer 510, client B computer 520 and server computer 530. WAN 502 is any wide area network that is now known or developed in the future. Generally, WAN will be a public network such that access to the communication links of WAN are substantially unrestricted and members of the general public are permitted to make communications over WAN 502.

Client A computer includes VPN/proxy software 512 and browser software 514. Because of its VPN aspect, VPN/proxy software 512 is software that can be used to set up a virtual private connection between client A computer and one or more predetermined computers present on WAN 502 (e.g., client B computer). Because of its proxying aspect, VPN/proxy software 512 can additionally be used to proxy communications VPN communications to be transmitted over WAN 502, where the VPN communications originate on other computers (not shown) connected to client A computer 510 by a LAN (not shown, e.g., a DICOM network in a hospital).

Browser software 514 can also be used to communicate data to and from client A computer 510 over WAN 502. However, the browser is preferably a standard browser and does not have functionality to handle VPN type communications. This generally means that the communications effected by browser 514 will be less secure than the VPN communications made using VPN/proxy software 510.

Despite this limitation, browser software 514 is instrumental in the exemplary VPN communications of the present embodiment both because it helps get the VPN/proxy software downloaded to client A computer 510 in the first place, and further because encryption module 514a, which is a part of the browser software, can be used to encrypt and decrypt VPN communications. This downloading and this encryption/decryption operation will be further explained below in connection with a flowchart. Also, other data communication functionality of the browser software 514 may be exploited to assist VPN/proxy software 512 in making its VPN type data communications.

Client B computer 520 is located at a remote location with respect to client A computer 510. VPN/proxy software 522 and browser software 524 are comparable to the corresponding pieces of software discussed above in connection with the client A computer.

Server computer 530 is a constructed with hardware and equipped with software as a server computer capable of receiving unsolicited requests for data to be served. Server computer 530 includes VPN/proxy server software 532, VPN/proxy server software memory 534, VPN way station software 536 and VPN data communication store and hold memory 538. While FIG. 9 shows only a single server computer for purposes of clarity of illustration, preferable multiple servers (e.g., server farms) are used to provide redundancy, power to handle more traffic and enhanced reliability.

VPN/proxy server software 532 is software that handles various requests, received over WAN 502, to download the VPN/proxy software 512, 522. In accordance with its programming, VPN/proxy software will evaluate which requests to download the software should be honored. For example, the party that controls server computer 530 may determine that download requests only from authorized clients are to be honored. Assuming that a valid download request is received, VPN proxy server software 532 will cause the VPN/proxy software 512, 522 to be read from VPN/proxy server software memory and then downloaded to the requesting computer over WAN 502.

VPN way station 536 is used to effect VPN type communications between client computers that are equipped with the VPN/proxy software 512, 522, such as client A computer 510 and client B computer 520. As will be further explained below in connection with a flow chart, VPN way station software receives VPN type data communications that are en route over WAN 502.

In some embodiments of the present invention, the VPN way station software allows the communications to be communicated when firewalls are in the way. At many client computers, the computer can communicate by opening a connection in some predetermined port in a client computer system's firewall. Because of the restrictions on the type of connections that may be established, it may be difficult for VPN client computers to directly communicate with each other over a mutual unsolicited-input connection. In this case, the VPN way station software 536, in conjunction with a source client computer and a destination client computer, can establish a separate unsolicited-input connection with each client computer, as shown in FIG. 9.

Also, VPN way station software 536 may be used to temporarily store data communications in VPN data store and hold memory 538. This is useful, for example, when the intended recipient of a VPN data communication is not ready to receive such a communication when it is sent. When the destination computer becomes ready to receive the data communication, VPN way station software can cause the communication to be read from the VPN data communication store and hold memory and sent to the (now-ready) destination computer. Additionally, the VPN way station software and the VPN data communication store and hold memory can be used to perform centralized archiving of data communications (e.g., medical images).

Finally, in some embodiments, the record of VPN communications maintained by the VPN way station software may provide a basis so that the provider of the VPN/proxy software and related server computer services can be compensated (in whole or in part) by various clients on the basis of the number and/or volume of VPN communications actually transmitted over system 500.

Figure 10:
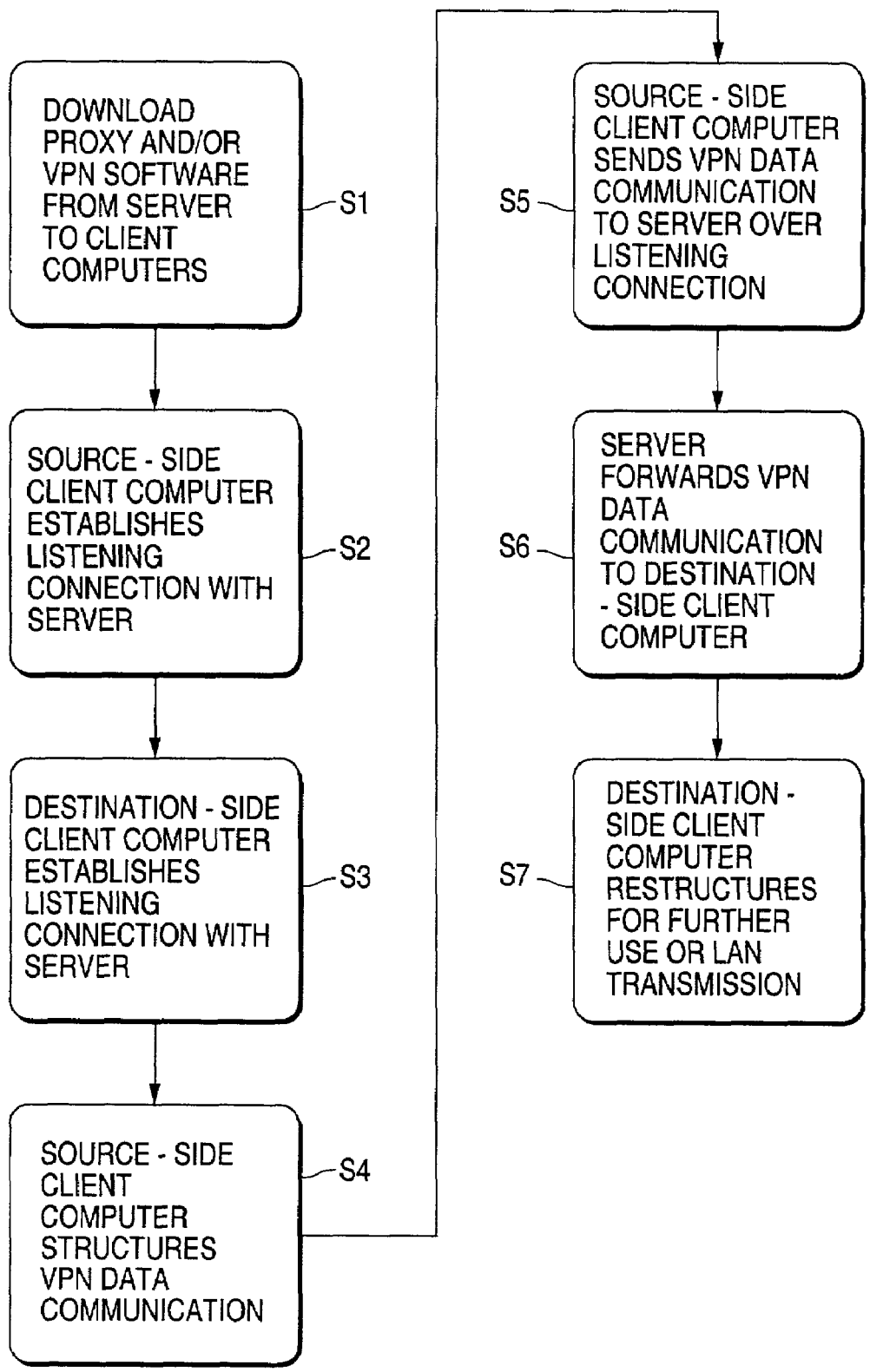
FIG. 10 is a flowchart that sets forth a method of computer network data communication according to the present invention.

Now exemplary data communication over system 500 will be discussed with reference to the flow chart shown in FIG. 10. As shown in FIG. 10, processing starts at step S1, wherein, client A computer 510 and client B computer 520 each request VPN/proxy server software 532 to cause downloading of the VPN/proxy software from VPN/proxy server software memory 534 to the respective computers 510, 520. It is noted that the VPN/proxy software is preferably does not permanently reside on any client computer, but rather, this software is downloaded to clients on an as-needed basis. This is preferred because the VPN/proxy software is subject to revision and debugging. Specifically, if the "master" version of the software is stored, updated and maintained on the server computer 530, then the downloaded software will automatically incorporate all the latest changes, each time it is downloaded.

Alternatively, the VPN/proxy software may reside on various clients, but the various clients may be allowed or mandated to replace their resident VPN/proxy software when there has been (or might have been) a change in the "master version" stored at the server computer. By not requiring a fresh download each and every time a series of communications is to be made, download time and download bandwidth may be conserved, while still ensuring that the most up-to-date version of the software is in use. For example, the software may contain revision codes that allow a client and server computer to efficiently determine whether a VPN/proxy program that is resident on a client is truly the most up-to-date version.

In step S1, it is the browser software 514, 524 that requests and effects the VPN/proxy software transfer from server computer 530. Because the server computer is a server, it can receive and respond, as appropriate, to these unsolicited requests for downloads received over WAN 502.

Once the VPN/proxy software 512, 522 is downloaded to the respective computers 510, 520, processing proceeds to step S2, wherein the freshly-downloaded VPN/proxy software 512 of client A computer 510 (with support as necessary from browser software 514) establishes an unsolicited-input connection with VPN way station software 536 of server computer 530. Although client A computer 510 must initiate this unsolicited-input connection with the server computer, once it has been opened, the connection can be maintained open so that client A computer can listen for data communications from server computer 530 over WAN 502 on an ongoing basis, without specifically requesting data from server computer 530 on a communication-by-communication basis. For example, by issuing GET commands on an open thread (as explained in connection with FIGS. 4 to 10) can be used to facilitate this unsolicited-input connection. In FIG. 9, this unsolicited-input communication is represented by the line drawn from VPN/proxy software 512 to the VPN way station software 536.

Processing proceeds to step S3, wherein VPN/proxy software 522 sets up a similar unsolicited-input connection between client B computer and server computer 530. While it is preferred to establish unsolicited-input connections between the source computer (that is, client A computer 510) and the server computer, and further to establish an unsolicited-input connection between the destination computer (that is, client B computer 520), this may not be necessary for all embodiments. More particularly, each separate communication necessary to effect the ultimate VPN data transfer could be initiated by the respective client computers, under solicited-data-only type connections. However, this alternative method may be less efficient because each client computer would need to be provided with the software and logic necessary initiate requests to the server computer on a communication-by-communication basis.

Processing proceeds to step S4, wherein VPN/proxy software 512 receives a data communication from a source computer (not shown) over a LAN (not shown). The proxy functionality of VPN/proxy software 512 allows this communication (not ultimately destined for client A computer 510) to be received by client A computer as a proxy. Also at step S4, VPN/proxy software 512 restructures the data communication, as necessary, so that it is in appropriate form and format for sending as a secure, VPN communication over WAN 502. Generally speaking, this restructuring can be considered as a protocol change (e.g., wrapping the data communication in a higher level protocol(s) to facilitate transmission over WAN 502).

Also at step S4, the data communication is encrypted by using SSL encryption software, which is part of encryption module 514*a* of client A computer 510. Use of this SSL encryption, which is conventionally included in browser software, is advantageous because most computers will be preloaded with a browser with SSL encryption, so there is no need to encode the encryption functionality into the (regularly downloaded) VPN/proxy software. Alternatively, the VPN/proxy software could be provided with its own encryption scheme.

At step S5, the VPN data communication is sent over the unsolicited-input connection, established at step S2, from client A computer 510 to the VPN way station software 536 of server computer 530.

At step S6, VPN way station software 536 forwards the VPN data communication over the unsolicited-input connection, established at step S3, from server computer 530 to client B computer 520. At step S6, the VPN data communication, and/or ancillary information regarding the specific VPN data communication, can be stored in store and hold memory 538. By using the store and hold memory, the VPN communication can be saved for a relatively long period of time, in the event that there is difficulty in immediately relaying the VPN data communication to client B computer 520 (e.g., client B computer is down or unavailable).

It is noted that the proxy functionality of VPN/proxy software 522 can allow client B computer to receive the VPN data communication on behalf of another computer (not shown) that is connected to client B computer by means of a LAN (not shown). Once the VPN data communication reaches VPN/proxy software 522 of client B computer 520, processing proceeds to step S7.

At step S7, the VPN data communication is restructured so that it can be utilized at client B computer 520 or at some other computer that is connected to the client B computer by means of a LAN. One part of this restructuring may involve a protocol change, such as stripping away high level protocol(s) that were temporarily necessary to allow the VPN data communication to be communicated over WAN 502. Also, the VPN data communication is decrypted using encryption module 524*a* of browser software 524. According to the foregoing method, the VPN communication was effected, despite the fact that no VPN software is permanently resident on either the client A source computer or the client B destination computer.

Fourth Embodiment

Figure 11:
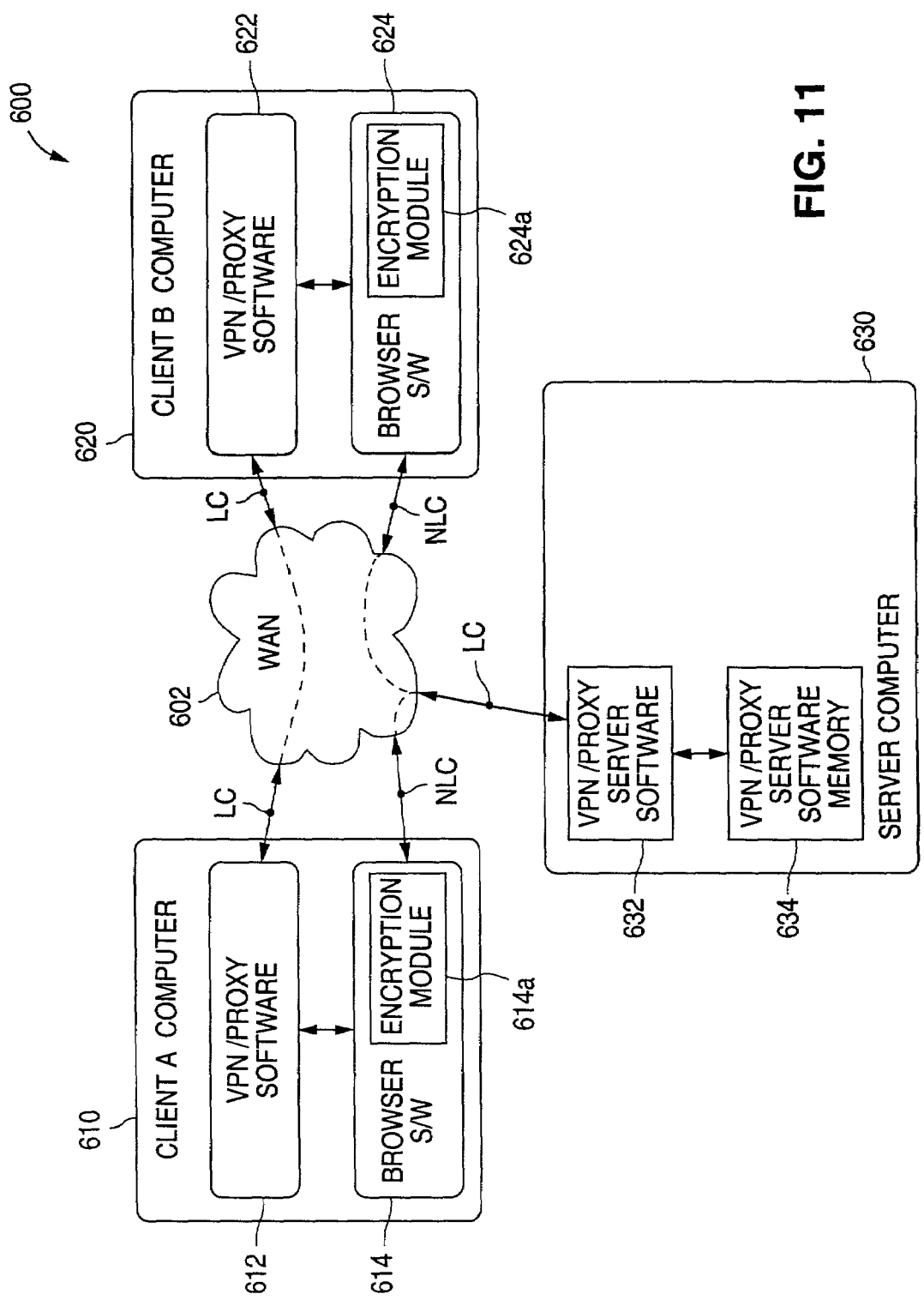
FIG. 11 is a block diagram of a fourth embodiment of a computer network communication system according to the present invention.

As shown in FIG. 11, computer network communication system 600 according to the present invention is similar in most respects to previously-discussed system 500, and, therefore, system 600 is not discussed in great detail herein. Like system 500, system 600 includes VPN/proxy server software so that the VPN/proxy software can be downloaded to a client machine upon demand. However, it is noted that in system 600, unlike system 500, does not include VPN way station software 536. According, VPN communications are communicated from VPN/proxy software 612 to VPN/proxy software 622 over WAN 602, without any sort of intermediate way station. (See communication line connecting software 612 to software 622 in FIG. 11.) Currently, this embodiment is not preferred because it is difficult to establish unsolicited-input connections between two non-server computers.

Fifth Embodiment

Figure 12:
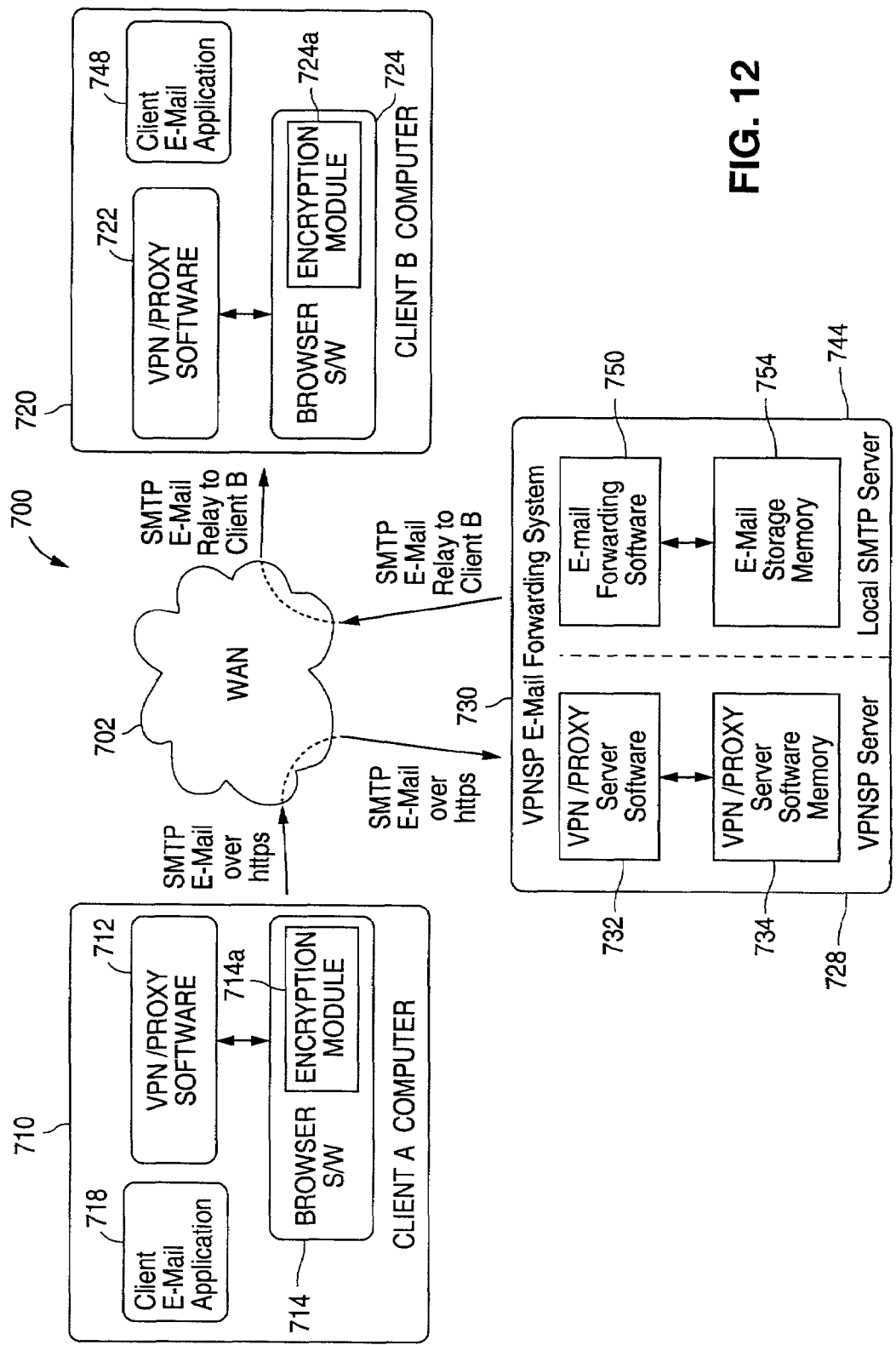
FIG. 12 is a block diagram of a fifth embodiment of a computer network communication system according to the present invention.

FIG. 12 shows another embodiment of a computer network communication system 700 according to the present invention. Communication system 700 includes WAN 702, client A computer 710, client B computer 720 and VPNSP e-mail forwarding system 730, including a VPNSP server and a local SMTP server. Once again, WAN 702 is any wide area network that is now known or developed in the future. Generally, WAN 702 will be a public network such that access to the communication links of WAN 702 are substantially unrestricted and members of the general public are permitted to make communications over WAN 702.

Like previous embodiments, Client A computer 710 includes VPN/proxy software 712 and browser software 714. The VPN/proxy software 712 can be used to set up a virtual private connection between client A computer 710 and one or more predetermined computers present on WAN 702 (e.g., client B computer 720). Because of its proxying aspect, VPN/proxy software 712 can additionally be used to proxy VPN communications to be transmitted over WAN 702, where the VPN communications originate on other computers (not shown) connected to client A computer 710 by a LAN.

Client A computer 710 further includes a client e-mail application 718, which uses a transfer protocol to send and receive e-mail messages. E-mail application 718 may a typical client e-mail application such as Netscape Communicator, Outlook Express and Eudora, all of which use a Simple Mail Transfer Protocol (SMTP). As would be understood by one of ordinary skill in the art, other e-mail applications using alternative transfer protocols may be used without departing from the scope of the present invention.

Client B computer 720 is located at a remote location with respect to client A computer 710. In some exemplary embodiments, VPN/proxy software 722, browser software 724 and client e-mail application 748 are comparable to the corresponding pieces of software discussed above in connection with the client A computer 710.

VPNSP e-mail forwarding system 730 includes server computer 728 having VPN/proxy server software 732 and VPN/proxy server software memory 734. While FIG. 12 shows only a single server computer for purposes of clarity of illustration, preferably multiple servers (e.g., server farms) are used to provide redundancy, power to handle more traffic and enhanced reliability.

VPN/proxy server software 732 is software that handles various requests, received over WAN 702, to download the VPN/proxy software 712, 722. In accordance with its programming, VPN/proxy software 712, 722 will evaluate which requests to download the software should be honored. For example, the party that controls server computer 730 may determine that download requests only from authorized clients are to be honored. Assuming that a valid download request is received, VPN proxy server software 732 will cause the VPN/proxy software 712, 722 to be read from VPN/proxy server software memory 734 and then downloaded to the requesting computer over WAN 702.

According to some preferred embodiments, the VPN/proxy software 712, 722 is an applet that is loaded into the browser (or applet runner) after the user has logged onto the VPNSP server 728 so that there is no need for permanent resident client-based VPN/proxy software. Also, a proxy is not necessarily created all the way through to client B computer 720. Instead, the only connection is to local SMTP server 744, which may reside on the same computer system or LAN as VPNSP server 728. Client B may or may not use their own VPNSP to retrieve their e-mail, but would typically use a protocol other than SMTP (such as POP or IMAP) since SMTP is usually used for sending e-mail instead of retrieving it.

VPNSP e-mail forwarding system 730 further includes local SMTP server 744, which is designed to transmit and store e-mail messages. SMTP server 744 includes e-mail forwarding software 750 and e-mail storage memory 754. While FIG. 12 shows only a single server computer for purposes of clarity of illustration, preferably multiple servers (e.g., server farms) are used to provide redundancy, power to handle more traffic and enhanced reliability.

In some exemplary embodiments, browser software 714 does not function as the integral e-mail communicator. Instead, client e-mail application 718 is used to communicate e-mail messages from client A computer 710 over WAN 702. Client e-mail application 718 pushes the e-mail message via SMTP directly to the VPN/proxy software 712 over a local host connection (such as IP address 127.0.0.1 on port number 25, the default SMTP port).

Browser software 714 helps get the VPN/proxy software downloaded to client A computer 710 and encryption module 714a, which is a part of the browser software, can be used to encrypt and decrypt VPN communications. The VPN communications are encrypted by using SSL encryption software, which is part of encryption module 714a of client A computer 710.

In the present embodiment, the VPN communications are e-mail messages that are transmitted as SMTP. These e-mail messages are encrypted and encapsulated into the VPNSP format and transmitted over an existing https connection through WAN 702 directly into the VPNSP server 728 of the VPNSP forwarding system 730. The VPNSP server 728 utilizes SSL decryption software to convert these e-mail messages back into SMTP and the local SMTP server 744 forwards the e-mail message to an SMTP server 760 having a POP/IMAP server 764 and an e-mail storage memory 768. At this point, client B can use client e-mail application 748 to retrieve the e-mail message from POP/IMAP server 764. In other exemplary embodiments, SMTP server 760 may be followed by a series of further SMTP servers depending on how the e-mail message is addressed. Alternatively, local SMTP server 744 may include its own POP/IMAP server 772 so that client B may retrieve e-mail messages directly from local SMTP server 744.

Some of the Inventive Ideas Present in the Foregoing Embodiments

Various embodiments of the invention have now been discussed in detail. Now the opportunity will be taken to discuss some of the potentially inventive concepts embodied in the foregoing embodiments.

One important concept is the idea that router software, VPN software, VPNSP software and other similar types of software maybe downloaded over a computer network. The simplest types of routers do not change the content or the protocol of the routed data communications at all. More complicated routers (as well as VPN and VPNSP systems) may change the protocol of data communications.

Conventionally, there are seven layers of protocol (according to the OSI—Open Systems Interconnect model: Application, Presentation, Session, Transport, Network, Data Link, Physical with Physical being the "lowest"). Changes, by various router, VPN and VPNSP systems, are especially common at the application layer and above. The types of protocol changes that may be made can reflect things such as machine id (MAC address), encryption scheme, port numbers, originating IP address and higher lever information (e.g., application title). For example, preferred VPNSP systems may modify port data or encryption scheme in order to better abide by network rules set up by network administrators (e.g., hospital network administrators).

VPN software establishes a direct, encrypted, virtual private network type connection. The encryption is what makes the VPN communication private. The VPN connection is not necessarily direct in the sense that the communication travels from source (e.g., source LAN) to destination (e.g., destination LAN) over a single unbroken wire, or over a single wireless link. Rather the VPN communication is merely as direct as a non-VPN communication made over a similar network would be. For example, a typical Internet communication may actually follow a convoluted path over a multiplicity of networked telephone lines and associated routers. A VPN communication made over the Internet would only be expected to be direct in the way that the conventional Internet communication is direct.

VPNSP software establishes an indirect, encrypted, virtual private network type connection. In many embodiments of the present invention, the VPNSP software connection is also indirect because network communications, instead of passing directly from a source to a destination, must pass through a site maintained by the service provider. The provider's site may be a predetermined site, or one of a set of predetermined sites working in concert. Sometimes the protocol of the communication will be modified at the provider's site.

Often VPN and VPNSP systems will include an entire encryption scheme in the VPN or VPNSP software itself. However, according to the present invention, VPN or VPNSP encryption may rely on preexisting encryption schemes already present in various software that is commonly resident on computers. For example, much Internet browser software has built-in encryption capabilities. According to the present invention, VPN or VPNSP software of the present invention may look to built in software encryption capabilities, rather than writing these into the main body of the VPN or VPNSP code.

For example, under preferred embodiments of the present invention, wherein VPN and/or VPNSP code is downloadable from a central location, it is advantageous to utilize (fairly ubiquitous) encryption software already built into network browsers—this saves on the amount of VPN or VPNSP code that must be transferred during the periodic downloads.

The preferred data structure for transferring router, VPN and/or VPNSP code according to the present invention is an applet that is executed by an applet runner. In the future downloadable computer programs may, of course, take different forma or be called by different names.

CONCLUSION

Many variations on the above-described computer network communication system are possible. Such variations are not to be regarded as a departure from the spirit and scope of the invention, but rather as subject matter intended to be encompassed within the scope of the following claims, to the fullest extent allowed by applicable law.

What is claimed is:

1. A computer network communication system comprising:
   a client computer system;
   a first computer network; and
   a server computer system comprising:
   a storage device, VPN software stored on the storage device, wherein the VPN software is an applet, and
   VPN server software for downloading the VPN software to a client computer system over the first network, with the VPN software being executable by the client computer system;
   wherein the VPN software comprises machine readable instructions and data for causing the client computer system to set up bi-directional communications, where such bi-directional communications are established by requests initiated by the client computer system, wherein the bi-directional communications include an unsolicited-input connection with the first network such that the client computer system will receive first-network-ready machine readable data from the first network over the unsolicited-input connection, regardless of whether the first-network ready data has been requested by the client computer system wherein the VPN software instructs the client computer system to set up the unsolicited-input connection of the bi-directional communications, by issuing a HTTP GET request, and if no response is provided in response to the HTTP GET request, the client computer system will issue subsequent HTTP GET requests, whereby the issuing of the HTTP GET requests, followed by the issuance of subsequent HTTP GET requests operates to create an idle state which provides for the unsolicited-input connection.

2. The computer network communication system of claim 1 wherein:
   the VPN software further comprises machine readable instructions and data for restructuring the first-network-ready data received over the unsolicited-input connection into corresponding second-network-ready data;
   the first-network-ready machine readable data is structured according to a first protocol; and
   the second-network-ready machine readable data is structured according to a second protocol, with the second protocol being different than the first protocol.

3. The computer network communication system of claim 2 wherein:
   the first protocol is a protocol adapted for data communications over a public network; and
   the second protocol is a protocol adapted for data communications over a private network.

4. The computer network communication system of claim 2 wherein:
   the first protocol is a TCP/IP protocol at a first layer; and
   the second protocol is DICOM at a second layer.

5. The computer network communication system of claim 1 wherein the client computer system comprises:
   a second computer network;
   a VPN client computer; and
   a destination computer, with the destination computer being structured to receive the second-network-ready data from the VPN client computer over the second network.

6. The computer network communication system of claim 1 wherein the first-network-ready data is sent to the client computer system over the first network by the server computer system.

7. The computer network communication system of claim 1 wherein:
the client computer system further comprises browser software comprising machine readable instructions for decrypting data; and
the VPN software further comprises machine readable instructions for utilizing the decryption capability of the browser software to decrypt the first-network-ready data when the execution of the VPN software by the client computer restructures the first-network-unready data into corresponding second-network-ready data.

8. The computer network communication system of claim 7 wherein: the browser is an Internet browser; and the encryption is SSL encryption.

9. A computer network communication system comprising:
a server computer system which is coupled to a first network, and with a client computer system;
wherein the server computer system includes a storage device, with VPN software stored on the storage device, wherein the VPN software is an applet, and the server computer system is operable to download the VPN software to the client computer system, and the VPN software being executable by the client computer system;
wherein the VPN software comprises machine readable instructions and data for causing the client computer to set up bi-directional communications, where such bi-directional communications are established by requests initiated by the client computer system, wherein the bi-directional communications include an unsolicited-input connection such that the client computer system will receive data over the unsolicited-input connection, regardless of whether the data has been requested by the client computer system wherein the VPN software instructs the client computer system to set up the unsolicited-input connection of the bi-directional communications, by issuing a HTTP GET request, and if no response is provided in response to the HTTP GET request, the client computer system will issue subsequent HTTP GET requests, whereby the issuing of the HTTP GET requests, followed by the issuance of subsequent HTTP GET requests operates to create an idle state which provides for the unsolicited-input connection.

10. The computer network communication system of claim 9 wherein:
the VPN software further comprises machine readable instructions and data for restructuring first-network-ready data received over the unsolicited-input connection into corresponding second-network-ready data;
wherein the first-network-ready machine readable data is structured according to a first protocol; and
wherein the second-network-ready machine readable data is structured according to a second protocol, with the second protocol being different than the first protocol.

11. The computer network communication system of claim 10 wherein:
the first protocol is a protocol adapted for data communications over a public network; and
the second protocol is a protocol adapted for data communications over a private network.

12. The computer network communication system of claim 10 wherein:
the first protocol is a TCP/IP protocol at a first layer; and
the second protocol is DICOM at a second layer.

13. The computer network communication system of claim 10 wherein:
the VPN software further comprises machine readable instructions for utilizing a decryption capability of a browser software program loaded on the client computer system to decrypt the first-network-ready data when the execution of the VPN software by the client computer system restructures the first-network-unready data into corresponding second-network-ready data.

14. The computer network communication system of claim 9 wherein the VPN software includes instructs the client computer system to set up the bi-directional communications, by issuing a series HTTP GET requests to create an idle state which provides for the unsolicited-input connection, and issuing HTTP POST requests where the client computer system is to send data.

* * * * *

UNITED STATES PATENT AND TRADEMARK OFFICE
CERTIFICATE OF CORRECTION

| | | |
|---|---|---|
| PATENT NO. | : 7,216,173 B2 | Page 1 of 1 |
| APPLICATION NO. | : 10/154445 | |
| DATED | : May 8, 2007 | |
| INVENTOR(S) | : Tom Clayton and Richard Bruce Rakes | |

It is certified that error appears in the above-identified patent and that said Letters Patent is hereby corrected as shown below:

IN THE SPECIFICATION

At column 3, line 49 please replace "LAN's" with -- LANs --.

At column 4, line 67 please replace "maybe" with -- may be --.

At column 9, line 13, please replace "Defines" with -- Defined --.

At column 20, line 63, please replace "maybe" with -- may be --.

IN THE CLAIMS

Claim 1, column 22, line 26/27, please replace "first-network ready" with -- first-network-ready --.

Claim 1, column 22, line 35, please replace "requests" with -- request --.

Signed and Sealed this

Eighteenth Day of December, 2007

JON W. DUDAS
*Director of the United States Patent and Trademark Office*